Nov. 1, 1955 G. A. BRACE 2,722,285
FILTER ASSEMBLY FOR SUCTION CLEANERS
Filed Aug. 20, 1953 3 Sheets-Sheet 1

INVENTOR.
George A. Brace
BY
ATTORNEY.

Nov. 1, 1955 — G. A. BRACE — 2,722,285
FILTER ASSEMBLY FOR SUCTION CLEANERS
Filed Aug. 20, 1953 — 3 Sheets-Sheet 2
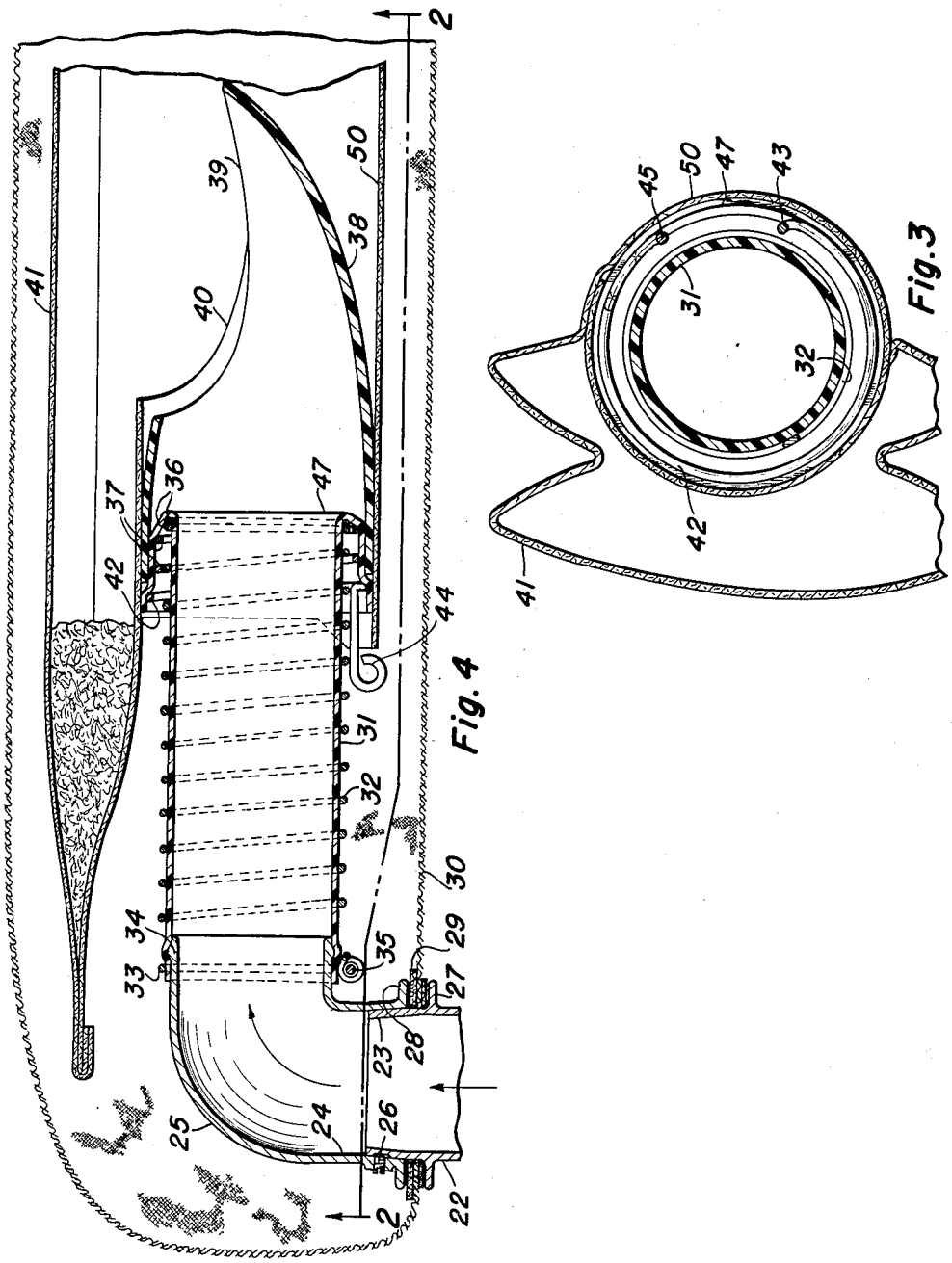
INVENTOR.
George A. Brace
ATTORNEY.

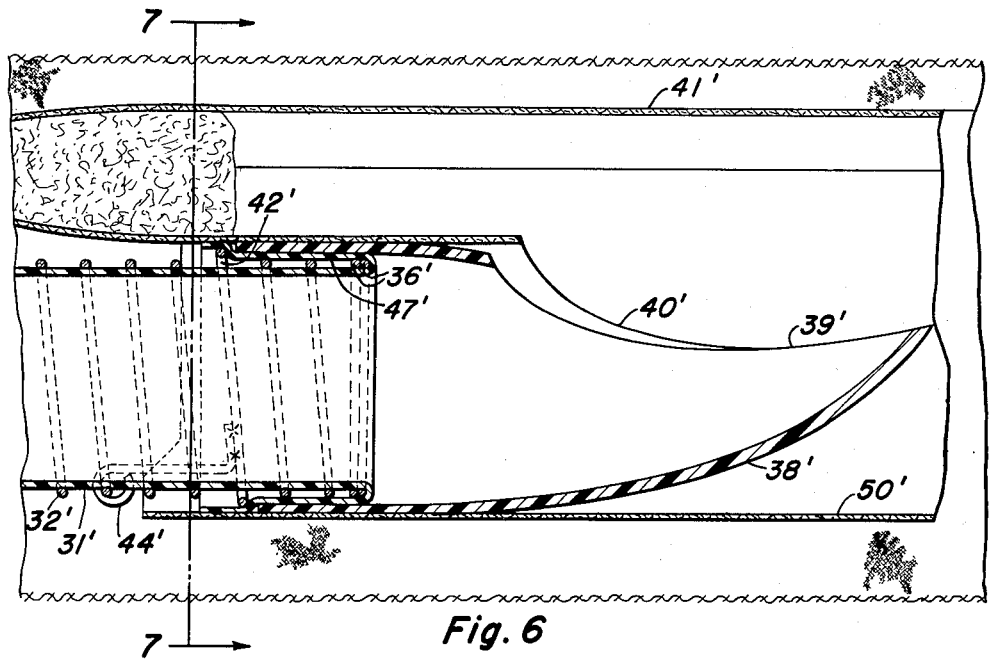
Fig. 6
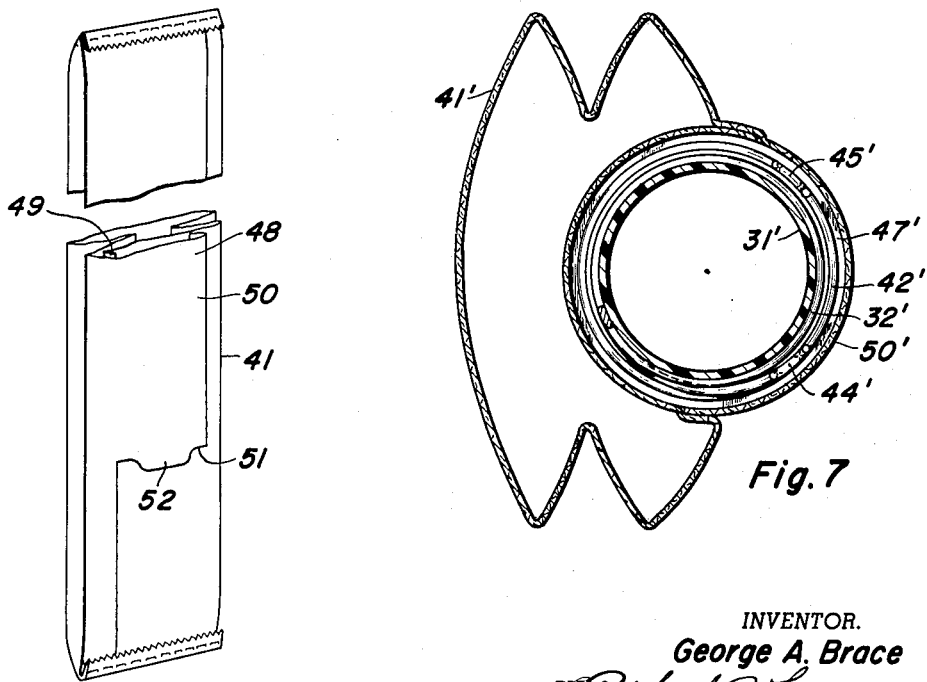
Fig. 5
Fig. 7

United States Patent Office 2,722,285
Patented Nov. 1, 1955

2,722,285

FILTER ASSEMBLY FOR SUCTION CLEANERS

George A. Brace, Highland Park, Ill., assignor to The Hoover Company, North Canton, Ohio, a corporation of Ohio Application August 20, 1953, Serial No. 375,461

10 Claims. (Cl. 183—43)

This invention relates to suction cleaners and more particularly to an improved filter assembly therefor featuring a low-cost, flexible adapter having novel filter clamping means.

Modern suction cleaners are designed for use with inexpensive disposable filter bags incapable of withstanding repeated flexing in use. Accordingly, it is essential to provide a filter adapter connection between the cleaner exhaust and the filter proper to absorb bending movements and other stresses which would otherwise flex the bag itself. Another requirement is the provision of simple and positive means for clamping the filter to the adapter without danger of rupturing the filter inlet. This problem is particularly acute when the design of the filter is such as to require an expanding type of clamp.

The present invention provides an unusually simple and inexpensive filter adapter fulfilling the foregoing and other prerequisites to an outstanding degree. This end is achieved by the use of a thin-walled flexible air duct protected by a resilient coil of wire. One end of this wire serves as a clamp for clamping the duct to the cleaner exhaust while turns at the exhaust end are employed to provide an expanding clamp for releasably coupling the duct to the inlet of a disposable filter bag.

Another feature of the invention is a disposable filter bag having an inlet tube extending longitudinally along the side of the bag formed by overlapping its longitudinal edges. Thus, the adapter may be arranged along one side of the filter so as to discharge the dirty air thereto intermediate its upper and lower ends. A protective appearance bag encloses both the filter and adapter assembly and its upper end is supported from the cleaner propelling handle. In consequence, the entire filter assembly pivots in unison with the handle and all flexing is confined to the flexible adapter.

Accordingly, it is a primary object of the invention to provide a suction cleaner having a unique filter assembly especially designed for use with inexpensive disposable filters.

Another object is the provision of a new filter adapter having a novel clamp for releasably coupling a filter bag to its discharge end.

A further object is the provision of a filter adapter comprising a thin-walled flexible duct and a resilient protective and supporting coil of relatively stiff springy material. This protective sheath may be employed to advantage for anchoring the adapter to the cleaner and for releasably coupling a filter inlet to its discharge end.

Yet another object is the provision of a filter adapter having a spiral wire reinforcing member and a thin-walled flexible duct extending through the wire coil with its discharge end turned backwardly on the exterior side of the wire coil to form a seating and air sealing surface for a filter inlet.

Numerous other advantages and objects of the invention will become readily apparent from the following detailed specification of two illustrative embodiments of the invention taken in connection with the accompanying drawings in which:

Figure 3 is a sectional view through the filter adapter taken along line 3—3 on Figure 2;

Figure 4 is a sectional view taken through the lower end of the filter assembly along line 4—4 on both Figures 1 and 2;

Figure 5 is a perspective view of one form of disposable filter bags for use on my novel filter adapter;

Figure 6 is a view similar to Figure 4 of a second embodiment; and

Figure 7 is a cross-sectional view taken along line 7—7 on Figure 6.

Figure 1:
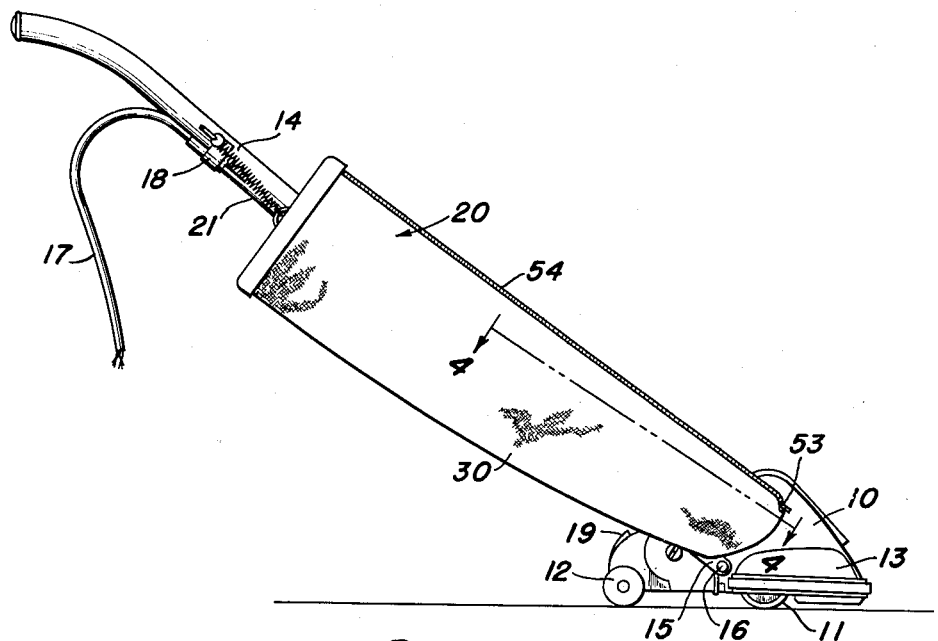
Figure 1 is a side elevational view of the floor cleaner embodying the invention.

Referring now to the drawings, it will be seen that the invention is shown as incorporated in a conventional floor type cleaner having a main body 10 supported on front carrier wheels 11 and rear wheels 12. The suction nozzle 13 extends across the front of the main body and extends upwardly into the inlet of a motor-fan unit enclosed by the body in a well known manner. The propelling handle 14 has a bail 15 at its lower end straddling the cleaner body and pivoted thereto at 16. The usual service cord 17 is anchored at 18 to the upper end of the propelling handle and extends therealong and into the cleaner body. The motor control switch is housed within the rear end of the cleaner body and is actuated by a push button 19 conveniently accessible to the operator's foot. The filter assembly, generally designated 20, extends along the side of the propelling handle to which its upper end is resiliently supported by a tension spring 21. The lowermost inner side of the appearance bag is preferably rotatable about the exhaust air conduit projecting laterally from the cleaner body, as best shown in Figure 4.

The exhaust air conduit 22 extends from the side of the motor driven suction unit and terminates close to the cleaner body. The outer end 23 is preferably tapered to provide an air tight seal with the similarly formed inlet end 24 of a rigid elbow 25. This elbow may be anchored to the discharge conduit as by a stud screw 26. The discharge conduit and end 24 of the elbow are provided with annular flanges 27, 28, respectively spaced apart to provide a retaining groove for an inlet collar 29 on the side of appearance bag 30. Collar 29 consists of one or more rings secured to the appearance bag and freely rotatable about the air discharge conduit.

Figure 2:
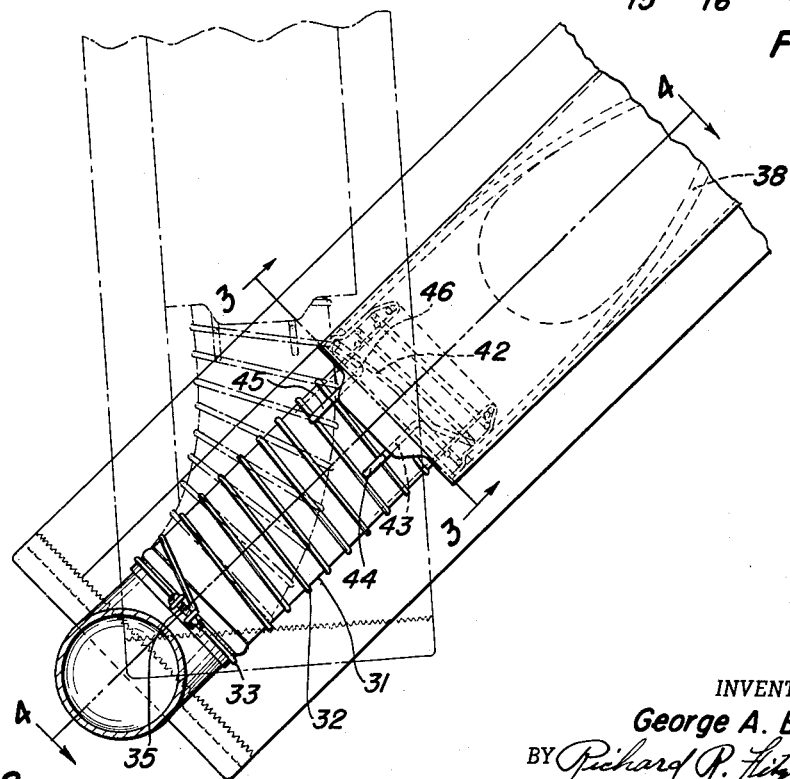
Figure 2 is a fragmentary sectional view on a vertical plane passing through the filter adapter elbow and taken along line 2—2 on Figure 4.

The filter adapter includes a thin-walled flexible duct 31 formed of rubber, thermo-plastic material, or the like. Surrounding this duct is a spiral coil of spring steel wire 32. Referring to Figure 2, it will be seen that the first turn 33 of this coil is preformed in such manner as to provide a split ring clamp for anchoring both the coil and flexible duct 31 to the outlet end 34 of elbow 25. Suitable loops formed in turn 33 cooperate with a nut and bolt 35 to clamp the first turn tightly to the elbow.

The manner in which the upper end of duct 31 and the wire coil 32 is formed to provide a resilient, yet airtight coupling with the inlet of a disposable filter bag will now be described. From Figure 4, it will be noted that there are a pair of closely spaced turns of wire 36, 36 at the uppermost end of the adapter. The next pair of turns 37, 37 are of slightly greater diameter and are spaced rearwardly of the discharge end to provide a seat for a combined air deflector and filter pilot 38 having a large discharge opening 39 directed toward an inlet 40 into the main body portion of the disposable filter bag 41.

The end turn 42 of the wire coil is formed with a diameter slightly in excess of turns 37 to form a self-expanding clamp for sealing the adapter to the inlet tube of the filter bag. Turn 42 is bent in the manner illustrated in Figure 2, and its terminal end 43 extends downwardly along the adapter to a point below the end of the filter inlet where it is bent upwardly into a finger piece 44. A separate piece of wire is bent to form a second finger piece 45 and this is anchored, as by welding, to the other end of filter clamp 42 peripherally spaced from the finger piece 44. From the foregoing, it will be clear that clamp 42 can be manually contracted to a considerably smaller diameter by pressing finger pieces 44 and 45 toward one another.

Note that the uppermost end 47 of duct 31 is turned backwardly and downwardly so as to overlie and cover turns 36, 37 and clamp 42 of the reinforcing wire coil. If the filter pilot 38 is formed of semi-rigid plastic material, as is preferable, it may be conveniently heat sealed to the adjacent portions of 47 of the plastic duct. It will also be obvious that the terminal rim portion of sleeve 47 overlies clamp 42 and forms a flexible resilient covering which is held firmly in contact with the inner wall of the filter inlet duct when the filter is in place on the adapter.

A suitable disposable paper filter bag generally designated 41 is illustrated in Figure 5. The complete constructional details of this bag are disclosed in my co-pending application for United States Letters Patent, Serial No. 333,110, filed January 26, 1953. It comprises a tubular envelope made of a single piece of paper the opposite longitudinal edges 48, 49 of which overlap one another and are sealed together to form an inlet tube 50 having an inlet end 51 spaced appreciably above the lower end of the filter bag proper. The upper portion of the inner wall of tube 50 has an inlet opening 40 into the main body portion of the bag. This inlet is, of course, positioned opposite discharge opening 39 of the filter adapter. The opposite ends of the filter bag are preferably sealed closed so that the dirt contents cannot be removed. The lower end of the filter provides a dirt storing pocket lying opposite the filter adapter while the upper end forms an air and dirt separating chamber. The inlet rim of tube 50 is provided with a finger tab 52 which assists in assembling the filter downwardly over pilot 38 of the adapter.

Operation

Let it be assumed that the operator wishes to assemble a filter bag onto the cleaner. Access is gained to the interior of appearance envelope 30 by pulling upwardly on tab 53 of a hookless fastener 54 extending along the top side of the envelope. The operator then grasps tab 52 of a new filter bag in the right hand as she compresses finger pieces 44 and 45 of clamping ring 42 toward one another by the thumb and index finger of the left hand. The pointed upper end of pilot 38 is then guided into the lower end of inlet tube 50 of the filter until it is fully seated in the position shown in Figure 4. Release of the pressure on finger pieces 44 and 45 then allows clamp 42 to expand under its own resiliency toward its normal position in which it presses the rim portions of duct 42 into airtight engagement with the inner wall of tube 50. Tab 53 is then pulled downwardly to close the appearance bag whereupon the cleaner is ready for cleaning operations.

As the propelling handle is pivoted between its vertical storage position and its lowermost horizontal operating position, it will be readily apparent that the appearance bag pivots in unison with the handle and that collar 29 of the appearance bag pivots freely about the end of exhaust air conduit 22. Elbow 25 is preferably secured to this conduit at an angle of 45 degrees to the horizontal. Accordingly, the swinging movement of the filter assembly causes the flexible filter adapter to readily flex as required by the movement of the handle and as clearly shown in Figure 2. Consequently, no flexing takes place in the filter bag proper. For this reason, it is unnecessary to reinforce any portions of the filter bag wall.

After the filter has become filled to capacity with dirt, it is a simple matter to remove it and replace it with a new one. This is accomplished by opening closure 54 and pressing finger pieces 44 and 45 together to release the bag so that it can be pulled off the adapter. As this occurs, inlet tube 50 collapses and prevents any dirt escaping from the interior. A new bag is installed on the adapter in the manner described above.

Second embodiment

The second embodiment is generally similar to the construction described above and the same or similar reference characters distinguished by a prime will be used in describing it. It differs in eliminating the large diameter turns of wire on the top of the adapter and in making one of the turns (here illustrated as the fourth turn from the top) of larger diameter and in such manner as to provide an expanding clamp 42' for coupling the adapter to the inlet tube of the filter bag. Separate pieces of wire 44', 45' are welded to peripherally spaced points along one side of this turn to provide finger pieces for contracting the clamp when assembling or disassembling a filter on the adapter. The outer end 47' of the thin-walled duct is then turned backwardly over the upper turns of the wire coil as well as over clamp 42', and part or all of its edge may be heat sealed to the outer wall of tube 31' below clamp 42', if so desired. In this event, slots will be necessary to by-pass finger pieces 44' and 45'. It will be quite apparent that the second embodiment functions in the same general manner as the first for which reason it is quite unnecessary to repeat what has been said above.

From the foregoing it will be readily apparent that various changes may be made in the above described structures without departing from the principles of the invention. While the end turns of the wire reinforcing coil have been shown as round, it may be desirable to flatten them to provide a wide, flat clamping ring. Also the finger pieces may be connected to the opposite end areas of adjacent turns of the wire coil. In this case, compression of the finger pieces serves to contract two turns instead of one and provides double the clamping area of a single ring.

While I have shown and described but two embodiments of my invention, it is to be understood that these embodiments are to be taken as illustrative only and not in a limiting sense. I do not wish to be limited to the particular structure shown and described but to include all equivalent variations except as limited by the scope of the claims.

I claim:

1. In a suction cleaner having a filter bag formed with a tubular main body, means secured to a side wall of said filter and cooperating therewith to form a tubular inlet passage having an inlet located intermediate the ends of said main body, and said tubular inlet having an opening into the main body of said filter bag spaced from said inlet that improvement which comprises, a filter adapter adapted to be releasably connected to said tubular inlet, said adapter comprising a flexible tube having intake and discharge ends, a spiral spring clamp surrounding the discharge end of said flexible tube having a normal unstressed diameter in excess of the internal diameter of said tubular inlet, a resilient sleeve overlying said clamp and having one end sealed to said flexible tube, said clamp including manually operable means for collapsing said clamp to a diameter such that said filter inlet can be telescoped readily over said sleeve whereby, upon the release of said manually operable means, said clamp expands and clamps said filter to said adapter with the main body of said filter lying along and closely beside said flexible tube of said adapter.

2. In a suction cleaner according to claim 1 wherein said manually operable means for said spring clamp is located on the opposite side of said adapter from the main body of said filter.

3. In a suction cleaner according to claim 1 including a pilot and deflector tube having one end secured to the discharge end of said adapter, said pilot and deflector having a large area side discharge opening positioned to direct the air stream into the main body of said filter through the opening in the side wall thereof, the outer end of said pilot tube being of smaller cross sectional area than the tubular inlet of said filter to facilitate the assembly of the filter bag onto said filter adapter.

4. A filter adapter assembly for a suction cleaner comprising means forming an exhaust air conduit having a fixed end in communication with the motor-fan unit of a suction cleaner and a free end, a circular spring clamp encircling the free end of said conduit and biased to be spaced radially outward therefrom, means supporting said spring clamp on said conduit without interfering with the contraction and expansion thereof, said clamp having peripheral portions spaced peripherally of one another, finger pieces secured to said spaced peripheral portions and operable when pressed toward one another to contract said clamp to a smaller diameter against its outward bias so that the inlet tube of a filter can be telescoped over the end of said adapter conduit and over said clamp, said clamp being operable when the pressure on said finger pieces is released to expand under its outward bias into firm clamping relation to the inner wall of the filter inlet.

5. In a suction cleaner having an exhaust air passage that improvement which comprises, a filter adapter assembly having its inlet end secured to the outlet end of said air passage, a thin-walled resilient tubular member surrounding the opposite outlet end of said filter adapter, the outlet end portion of said resilient tubular member being secured to said adapter in an airtight manner, a resilient spiral ring surrounding said adapter adjacent the outlet end thereof at a point underlying said resilient tubular member and normally acting to expand the latter outwardly to a larger diameter than the normal unstressed diameter of said resilient tubular member, said tubular member forming a resilient seating surface for the inlet tube of a dirt filtering bag, and manually operable means for contracting said spiral ring while the inlet tube of a filter bag is being telescoped thereover and operable when released to expand said resilient tubular member into airtight clamping engagement with the inner wall of the filter inlet tube.

6. In a suction cleaner having an exhaust air conduit discharging rearwardly and upwardly therefrom that improvement which compries, a resilient flexible-walled tube having its lower end connected thereto, a thin-walled flexible sleeve surrounding the upper end of said tube, one end of said sleeve being integrally joined with said tube in an airtight manner, a resilient expanding type spring clamp interposed between said sleeve and said tube having a substantially continuous line of contact with the interior circumferential surface of said sleeve and normally tending to expand the same to a diameter in excess of the unstressed diameter of said sleeve, said spring clamp including a pair of finger pieces at the opposite circumferential ends thereof operable when pressed toward one another to contract said clamp to a smaller diameter so that the inlet tube of a filter bag can be telescoped onto said sleeve, said clamp when released after contraction being operable to expand said sleeve into airtight engagement with the interior wall of said filter inlet, and said spring clamp being operable to release said filter inlet when said finger pieces are again depressed toward one another so as to contract said spring clamp.

7. A filter adapter assembly for a suction cleaner comprising, a thin-walled flexible tube, a reinforcing wire coil of resilient material surrounding said tube, one end of said tube being longer than said wire coil and being folded backwardly over the end turns thereof to form a smooth surfaced seat for the inlet of a filter bag, at least one turn of said wire coil underlying the filter seating portion of said tube being larger in diameter than the adjacent turns of said coil, and manually operable means secured to spaced-apart points on said larger diameter portion of said coil for contracting said larger diameter portion sufficiently to permit the telescoping of a filter inlet tube thereover whereby the release of said manually operable means permits said coil to expand against the inner wall of a filter inlet and clamp the same to said adapter in an airtight manner.

8. A filter adapter assembly for a suction cleaner as defined in claim 7 wherein said manually operable means comprises a pair of finger grip members located along a side wall of said adapter in an area spaced closely adjacent the folded back end of said thin-walled tube forming said seating surface whereby said finger grip members are freely accessible when the inlet of a filter bag is in place on said adapter.

9. A filter adapter assembly for a suction cleaner as defined in claim 7 including a tubular filter pilot member having one end seated upon and secured to the end portion of said adapter in position to guide a filter inlet onto said filter seating surface, said pilot having a large area outlet opening adjacent its opposite end, said opposite end being of reduced cross section to facilitate its entry into a filter inlet as the same is being telescoped thereover.

10. A filter adapter assembly for a suction cleaner as defined in claim 7 wherein the end of said wire coil opposite the filter seating end of said adapter is formed into a loop for encircling a clamping bolt and wherein an adjacent turn of said coil includes a clamping bolt encircling loop at a point spaced circumferentially from said first mentioned loop, and a clamping bolt extending through said loops for drawing the same together to clamp said adapter to the exhaust air passage of a suction cleaner.

References Cited in the file of this patent

UNITED STATES PATENTS

| | | |
|---|---|---|
| 1,698,087 | Field | Jan. 8, 1929 |
| 1,805,174 | Gudka | May 12, 1931 |
| 1,861,402 | Van Riper | May 31, 1932 |
| 2,159,116 | Zacharias | May 23, 1939 |
| 2,577,863 | Sosnowich | Dec. 11, 1951 |
| 2,594,281 | Berg | Apr. 29, 1952 |